US011934154B2

(12) United States Patent
Muraji

(10) Patent No.: US 11,934,154 B2
(45) Date of Patent: Mar. 19, 2024

(54) TIMEPIECE WITH MOVABLE ORNAMENTAL BODY

(71) Applicant: Seiko Clock Inc., Tokyo (JP)

(72) Inventor: Toyonori Muraji, Tokyo (JP)

(73) Assignee: SEIKO TIME CREATION INC., Tokyo (JP)

( * ) Notice: Subject to any disclaimer, the term of this patent is extended or adjusted under 35 U.S.C. 154(b) by 1007 days.

(21) Appl. No.: 16/587,743

(22) Filed: Sep. 30, 2019

(65) Prior Publication Data

US 2020/0333747 A1 Oct. 22, 2020

(30) Foreign Application Priority Data

Apr. 17, 2019 (JP) ................................ 2019-078602

(51) Int. Cl.
*G04B 45/00* (2006.01)
*G04B 47/04* (2006.01)

(52) U.S. Cl.
CPC ..... *G04B 45/0023* (2013.01); *G04B 45/0038* (2013.01); *G04B 47/044* (2013.01)

(58) Field of Classification Search
CPC ............ G04B 45/0023; G04B 45/0038; G04B 47/044; G04B 19/16
See application file for complete search history.

(56) References Cited

U.S. PATENT DOCUMENTS

| | | | | |
|---|---|---|---|---|
| 7,480,213 B2 * | 1/2009 | Muraji | .................. | G04B 19/16 368/228 |
| 9,176,477 B2 * | 11/2015 | Muraji | .............. | G04B 45/0038 |
| 9,213,315 B2 * | 12/2015 | Takematsu | .......... | G04B 47/044 |
| 2007/0277578 A1 * | 12/2007 | Muraji | .............. | G04B 45/0023 72/354.2 |
| 2008/0239884 A1 * | 10/2008 | Muraji | ................ | G04B 47/044 368/232 |

FOREIGN PATENT DOCUMENTS

| | | | | |
|---|---|---|---|---|
| JP | 11235473 A * | 8/1999 | ............ | A63H 13/04 |
| JP | 2014-215093 A | 11/2014 | | |
| KR | 200149428 Y1 * | 6/1999 | ......... | G04B 45/0076 |

* cited by examiner

*Primary Examiner* — Edwin A. Leon
*Assistant Examiner* — Sean R Brannon
(74) *Attorney, Agent, or Firm* — Crowell & Moring LLP

(57) ABSTRACT

A timepiece includes three types of decorative plates. A first type of decorative plate includes numbers from 1 to 12 indicative of time in hours and is rotatable around a central axis of the time piece. A second type of decorative plate includes a plurality of second type of plate pieces collectively rotatable relative to the first type of decorative plate and each rotatable around its respective axis. The third type of decorative plate includes a plurality of third type of plate pieces collectively rotatable relative to the central axis of the timepiece and each movable radially with respect to the central axis of the timepiece.

7 Claims, 7 Drawing Sheets

TIMEPIECE WITH MOVABLE ORNAMENTAL BODY

RELATED APPLICATIONS

This application claims priority to Japanese Patent Application No. 2019-078602, filed on Apr. 17, 2019, the content of which is incorporated herein by reference.

BACKGROUND OF THE INVENTION

1. Field of the Invention

The present invention relates to a timepiece.

2. Description of the Related Art

There is a gimmick clock moving a decorative body (refer to, for example, Japanese Patent No. 6088898). The gimmick clock described in Japanese Patent No. 6088898 includes a rotatably disposed decorative plate and a decorative body disposed on the front side of the decorative plate and movable, in which the decorative plate and the decorative body function as a single dial, and at a predetermined time, the decorative plate rotates and the decorative body rotates while revolving.

However, it is desired to develop a timepiece in which a decorative body operates in a more complicated manner.

SUMMARY OF THE INVENTION

Therefore, the present invention provides a timepiece having a decorative body operating in a complicated manner.

According to a first aspect of the present invention, there is provided a timepiece including a main plate; a rotating plate rotatable relative to the main plate around a predetermined axis of rotation; a gear rotatably supported on the rotating plate and rotating in synchronization with rotation of the rotating plate with respect to the main plate; and a decorative body that is linked with the gear and displaced along a first direction extending radially with the axis of rotation as a center when viewed from the rotating plate.

According to the first aspect of the present invention, it is possible to move the decorative body in a direction towards and away from the axis of rotation while making the decorative body revolve around the axis of rotation in synchronization with the rotation of the rotating plate. Accordingly, the timepiece provided with the decorative body performing a complicated operation that is not performed in the timepiece of the related art can be provided.

According to a second aspect of the invention, in the timepiece of the first aspect, the decorative body may be disposed on a rear side of a dial, the decorative body may be configured to protrude from the dial when viewed from the front.

According to the second aspect of the present invention, it is possible to express an operation in which the decorative body protrudes from the rear side of the dial or returns to the rear side of the dial. Accordingly, it is possible to make the timepiece more interesting as compared with the timepiece of the related art.

According to a third aspect of the invention, in the timepiece of the first or second aspect, the main plate may be provided with a tooth part extending in a circular-arc shape with the axis of rotation as a center, and the gear may mesh with the tooth part.

According to the third aspect of the present invention, if the rotating plate is rotated relative to the main plate, the gear meshing with the tooth part of the main plate rotates while revolving around the axis of rotation. Accordingly, it is possible to form the gear rotating in synchronization with the rotation of the rotating plate.

According to a fourth aspect of the invention, in the timepiece of the first, second, or third aspect, a direction orthogonal to the first direction when viewed in an axial direction of the axis of rotation may be set as a second direction, and the rotating plate may be provided with a restriction portion capable of corning into contact with the decorative body in the second direction.

According to the fourth aspect of the present invention, the displacement of the decorative body in the second direction can be restricted by the restriction portion. Accordingly, it is possible to make the decorative body revolve around the axis of rotation in synchronization with the rotation of the rotating plate.

According to a fifth aspect of the invention, in the timepiece of the fourth aspect, the decorative body may be configured to come into contact with the restriction portion at at least two points different in position from each other in the first direction.

Here, in a case where the restriction portion comes into contact with the decorative body at one point, there is a possibility that the decorative body may be displaced so as to rotate on the rotating plate with the contact portion as a fulcrum. According to the fifth aspect of the present invention, it is possible to suppress the decorative body being displaced so as to rotate on the rotating plate. Therefore, it is possible to make the decorative body be displaced along the first direction extending radially with respect to the rotating plate.

According to a sixth aspect of the invention, in the timepiece of any one of the first to fifth aspects, the gear may be provided with a guide pin protruding toward the decorative body side at a position eccentric with respect to a center of rotation of the gear, and the decorative body may have a guide groove extending in a direction intersecting the first direction, the guide pin may be inserted into the guide groove.

According to the sixth aspect of the present invention, it is possible to make the decorative body be displaced in the first direction in conjunction with the displacement of the guide pin in the first direction while allowing the displacement of the guide pin relative to the decorative body in the direction intersecting the first direction by making the guide pin be displaced in the guide groove. Therefore, it is possible to convert the rotary motion of the gear into the linear motion of the decorative body.

According to a seventh aspect of the invention, in the timepiece of any one of the first to sixth aspects, the timepiece may further include a pressing plate coming into contact with the decorative body on an opposite side of the decorative body from the rotating plate.

According to the seventh aspect of the present invention, the displacement of the decorative body in the direction away from the rotating plate can be restricted by the pressing plate. Therefore, it is possible to stabilize the decorative body.

According to an eighth aspect of the invention, in the timepiece of the seventh aspect, the decorative body may be in contact with the pressing plate at at least two points different in position from each other in the first direction.

Here, in a case where the pressing plate comes into contact with the decorative body at one point, there is a possibility that the decorative body may be displaced so as to be deflected with the contact portion as a fulcrum.

According to the eighth aspect of the present invention, it is possible to suppress the deflection of the decorative body. Therefore, it is possible to more stabilize the decorative body.

According to the present invention, it is possible to provide a timepiece having a decorative body operating in a complicated manner.

DETAILED DESCRIPTION OF THE PREFERRED EMBODIMENTS

Figure 1:
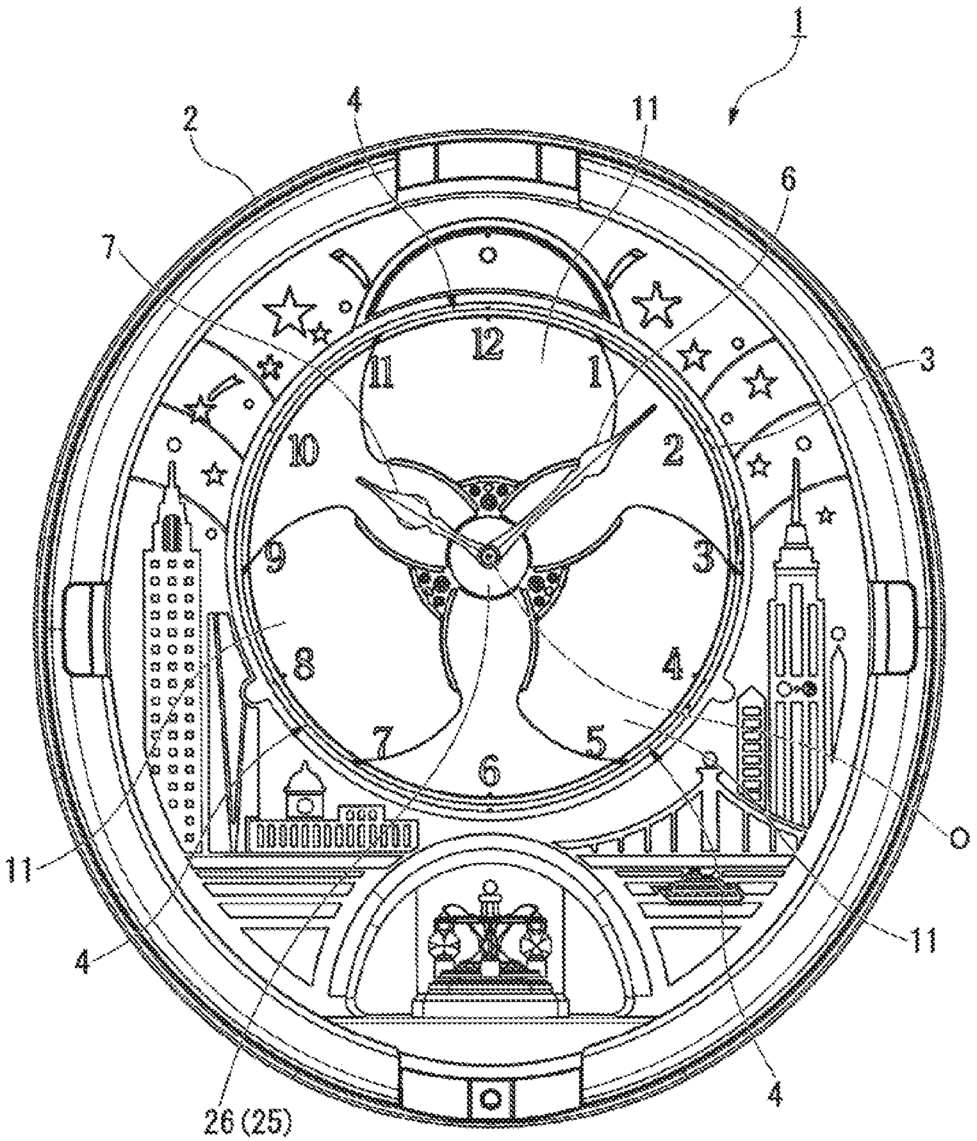
FIG. 1 is a front view of a timepiece of an embodiment.

Hereinafter, an embodiment of the present invention will be described based on the drawings. In the following description, configurations having the same or similar function are denoted by the same reference numerals. Then, there is a case where overlapping description of these configurations is omitted.

First, the schematic configuration of a timepiece 1 will be described.

Figure 2:
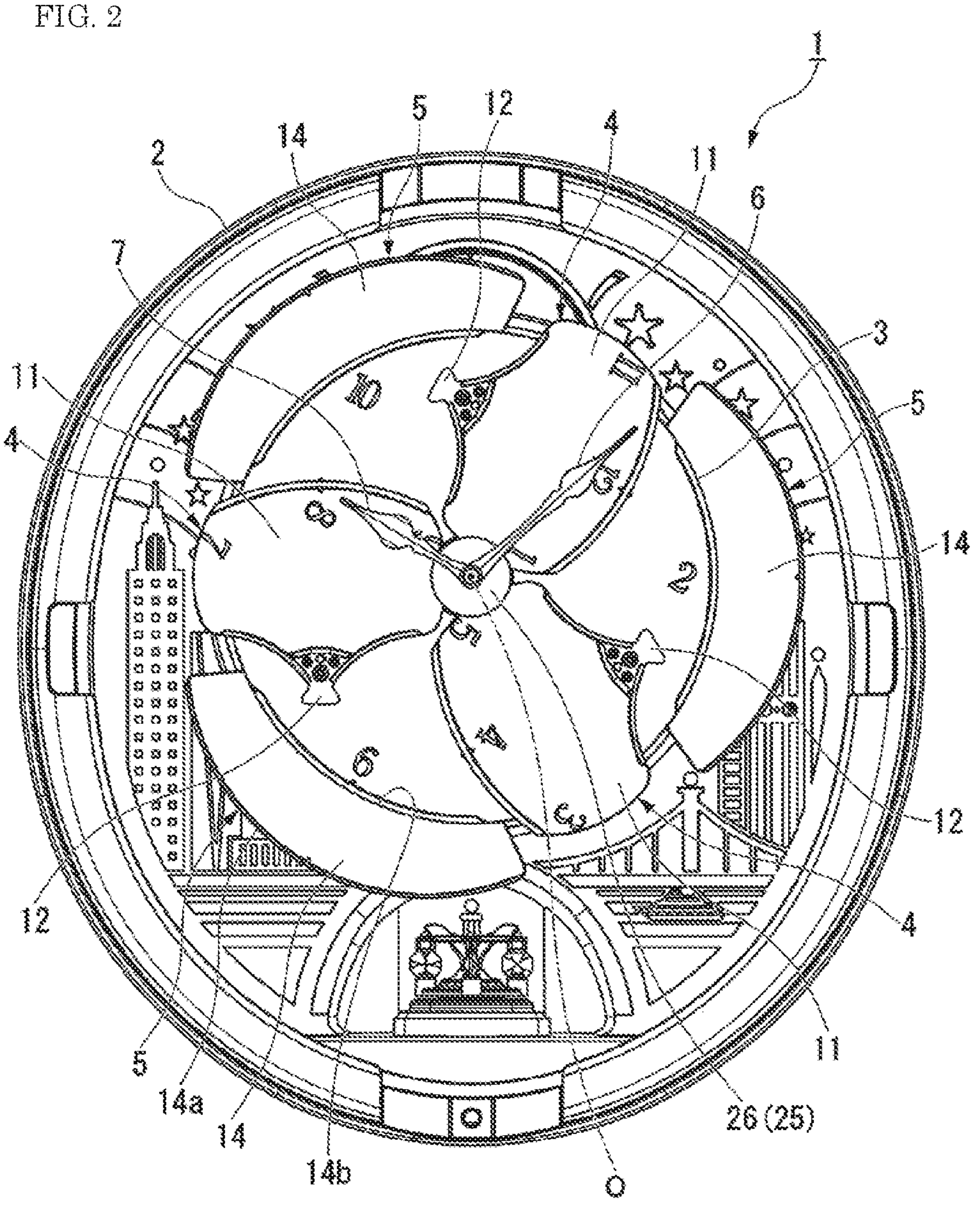
FIG. 2 is a front view of the timepiece of the embodiment.

FIGS. 1 and 2 are front views of a timepiece of an embodiment.

As shown in FIGS. 1 and 2, the timepiece 1 is a gimmick clock. The timepiece 1 includes a front plate 2 which is decorated and has an opening formed at the center thereof, a decorative plate 3 rotatably disposed in the opening of the front plate 2, a plurality of (in this embodiment, three) front decorative bodies 4 which are disposed on the front side of the decorative plate 3 and movable, a plurality of (in this embodiment, three) rear decorative bodies 5 which are disposed on the rear side of the decorative plate 3 and movable, and a minute hand 6 and a hour hand 7 rotating around a central axis O (an axis of rotation) and indicating the time. FIG. 1 shows a state where the decorative plate 3, the front decorative bodies 4, and the rear decorative bodies 5 are in the initial positions.

The decorative plate 3 is formed in a disk shape centered on the central axis O. Numbers indicating the time are clearly indicated on the front surface of the decorative plate 3. In this embodiment, numbers "2", "6", and "10" are clearly indicated at equal angular intervals around the central axis O on the front surface of the decorative plate 3.

The plurality of front decorative bodies 4 are provided so as to be rotatable relative to the decorative plate 3. The plurality of front decorative bodies 4 are disposed at equal angular intervals around the central axis O. Each of the plurality of front decorative bodies 4 includes a plate portion 11 on which numbers indicating the time are stated, and a tip portion 12 extending from the plate portion 11 toward the central axis O side. Numbers "11", "12", and "1" are clearly indicated on the front surface of the plate portion 11 of the first front decorative body 4. Numbers "3", "4", and "5" are clearly indicated on the front surface of the plate portion 11 of the second front decorative body 4, Numbers "7", "8", and "9" are clearly indicated on the front surface of the plate portion 11 of the third front decorative body 4. In the initial state, the plurality of front decorative bodies 4 are disposed so as to expose the numerals clearly indicated on the decorative plate 3. In the initial state, the numbers clearly indicated on the decorative plate 3 and the numbers clearly indicated on the plurality of front decorative bodies 4 are arranged at equal angular intervals around the central axis O when viewed from the front. In the initial state, the decorative plate 3 and the plurality of front decorative bodies 4 are maintained in a circular state as a whole when viewed from the front and function as a single dial.

The plurality of rear decorative bodies 5 are formed so as to be parallel-movable with respect to the decorative plate 3 and to be able to protrude from the decorative plate 3 to the outside in a radial direction when viewed from the front. The plurality of rear decorative bodies 5 are disposed at equal angular intervals around the central axis O. Each of the plurality of rear decorative bodies 5 is provided with a protrusion portion 14 protruding from the decorative plate 3 to the outside in the radial direction. The protrusion portion 14 is formed in a plate shape extending along a circumferential direction around the central axis O. The protrusion portion 14 is provided with an outer peripheral edge **14*a* and an inner peripheral edge 14*b* each extending in a circular-arc shape. The outer peripheral edge 14*a* extends in a circular-arc shape less than 120° with the central axis O as the center in the initial state. In the initial state, the entirety of the plurality of rear decorative bodies 5 is covered with the decorative plate 3 when viewed from the front. The inner peripheral edge 14*b* extends in a circular-arc shape less than 120° with the central axis O as the center in a state where the rear decorative body 5 most protrudes with respect to the decorative plate 3 (a state shown in FIG. 2; hereinafter, referred to as a protruding state). The inner peripheral edge 14*b* overlaps the outer peripheral edge of the decorative plate 3** in the radial direction in the protruding state.

As shown in FIG. 2, at a predetermined time, the decorative plate 3 rotates around the central axis O and the plurality of front decorative bodies 4 rotate while revolving around the central axis O. Further, the plurality of rear decorative bodies 5 protrude to the outside in the radial direction so as to be exposed from the rear side of the decorative plate 3 while revolving around the central axis O together with the decorative plate 3. After a predetermined time has elapsed, the decorative plate 3, the plurality of front decorative bodies 4, and the plurality of rear decorative bodies 5 return to the initial positions thereof. In this manner, the timepiece 1 executes a gimmick motion at the predetermined time. A rotation range, movement, or the like of the decorative plate 3 is not particularly limited, and for example, the decorative plate 3 may be set so as to rotate 360°. Further, the timepiece 1 may be configured such that music is output from a speaker while the decorative plate 3 is rotating.

Subsequently, the configuration of the main part of the timepiece 1 will be described in detail.

Figure 3:
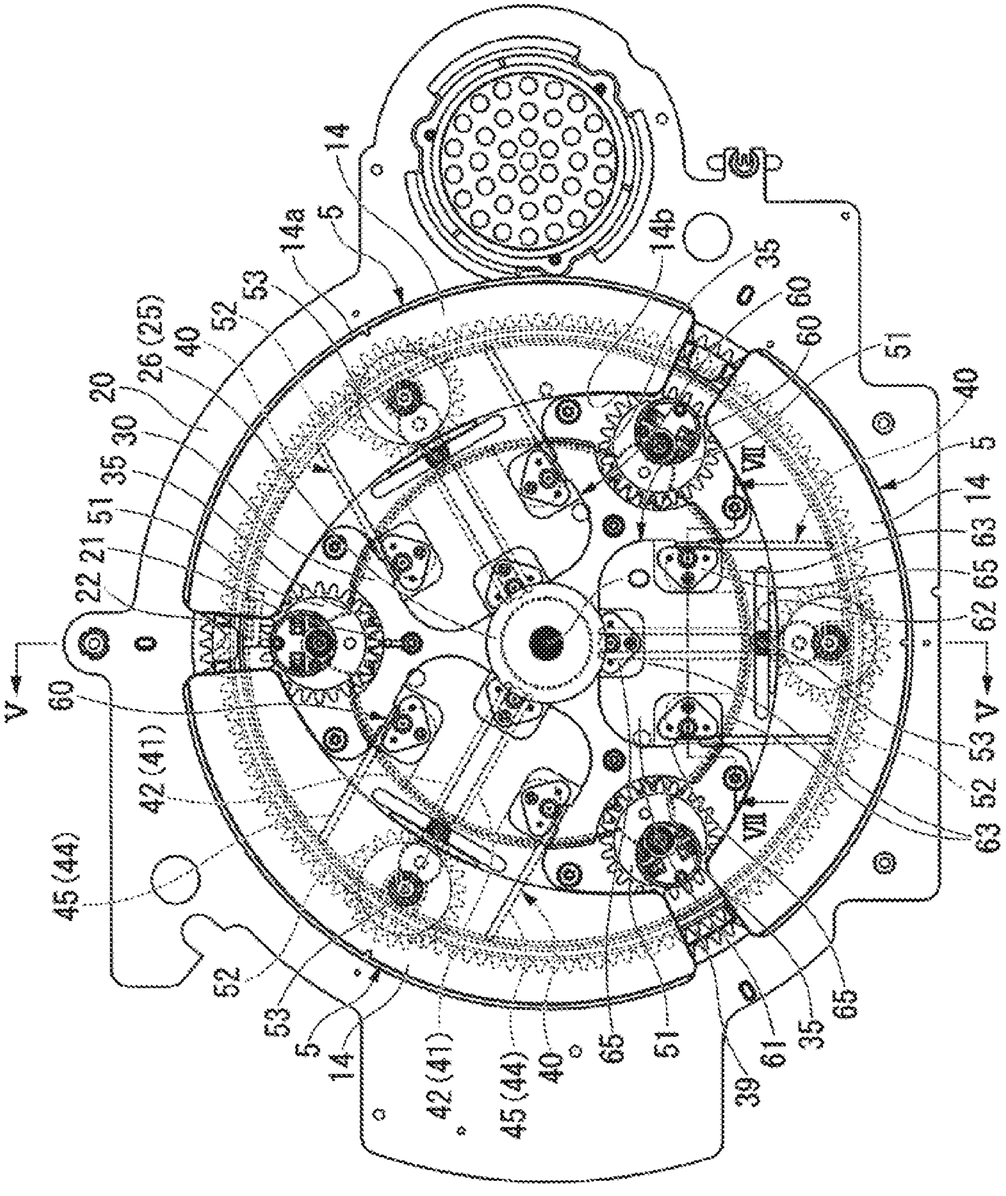
FIG. 3 is a plan view showing a part of the timepiece of the embodiment.
Figure 4:
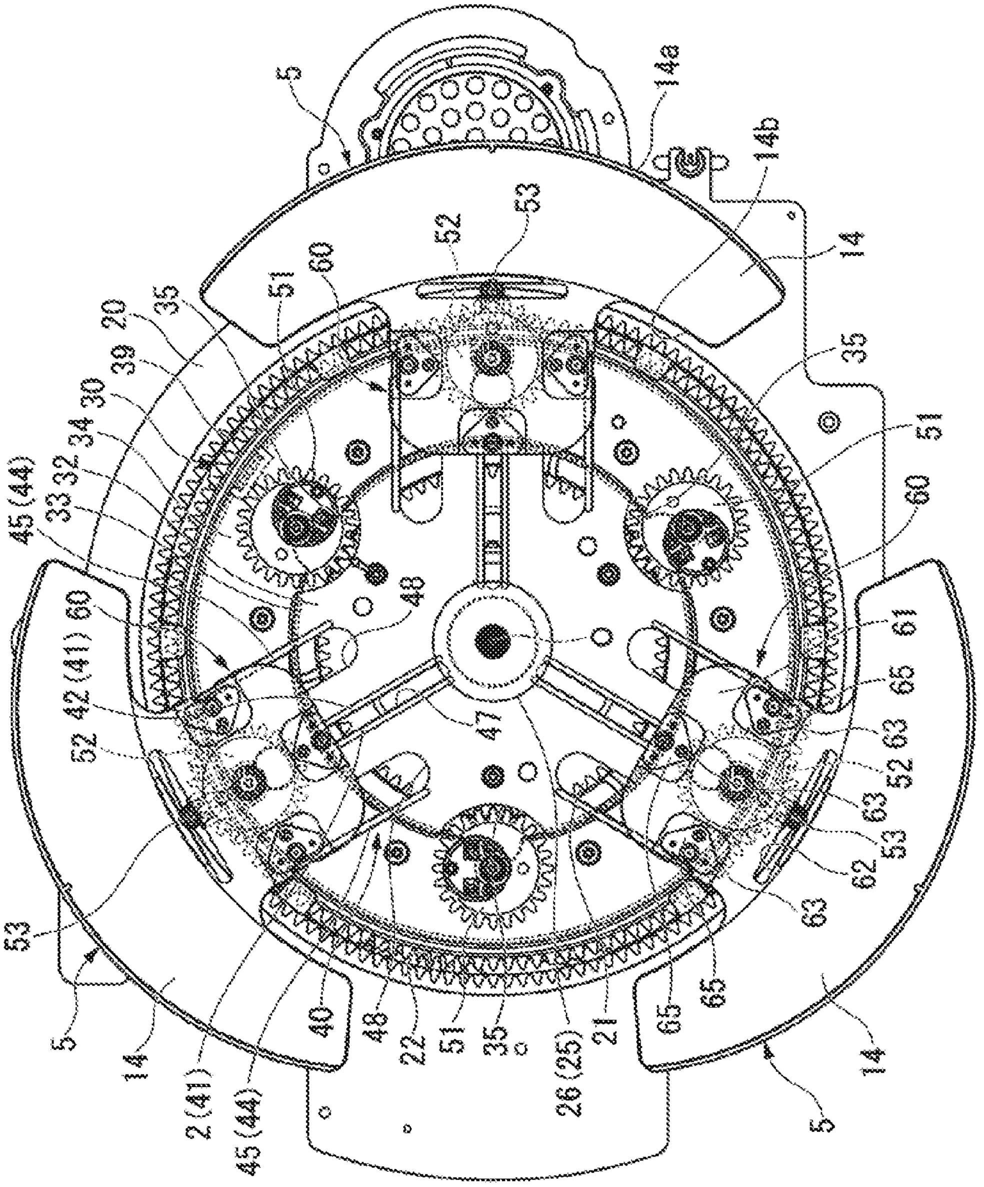
FIG. 4 is a plan view showing a part of the timepiece of the embodiment.
Figure 5:
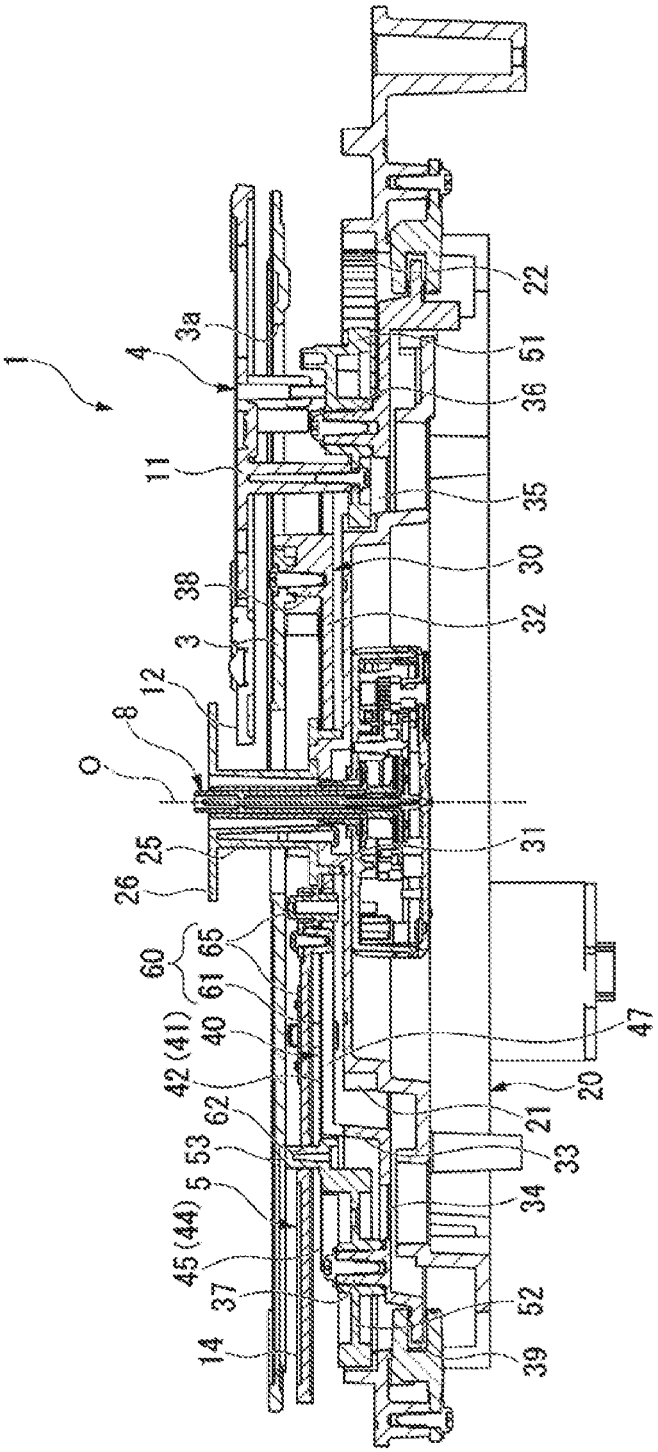
FIG. 5 is a cross-sectional view taken along line V-V of FIG. 3.

FIGS. 3 and 4 are plan views showing a part of the timepiece of the embodiment. FIG. 5 is a cross-sectional view taken along line V-V of FIG. 3. In FIGS. 3 and 4, the decorative plate and the front decorative bodies are not shown.

As shown in FIGS. 3 to 5, the timepiece 1 includes a fixedly disposed main plate 20, a fixed member 25 fixedly supported on the main plate 20, a rotating plate 30 rotatable relative to the main plate 20 around the central axis O, and a plurality of first gears 51 and a plurality of second gears 52 rotatably supported on the rotating plate 30 and rotating in synchronization with the rotation of the rotating plate 30 with respect to the main plate 20. The plurality of first gears 51 are provided in the same number as the plurality of front decorative bodies 4 (refer to FIG. 1). The plurality of second gears 52 are provided in the same number as the plurality of rear decorative bodies 5. In the following description, a direction along the central axis O is referred to as an axial direction, a direction orthogonal to the central axis O and radially extending from the central axis O is referred to as a radial direction, and a circumferential direction around the central axis O is simply referred to as a circumferential direction.

As shown in FIGS. 3 and 5, the main plate 20 is disposed on the rear side of the decorative plate 3. A movement for driving a rotary shaft 8 to which the minute hand 6 and the hour hand 7 are mounted, a motor for driving the rotating plate 30, and the like are disposed on the rear side of the main plate 20. The rotary shaft 8 penetrates the approximate center of the main plate 20. External teeth 21 and internal teeth 22 (a tooth part) are provided on the front side of the main plate 20. The external teeth 21 extend 360° in a circular-arc shape with the central axis as the center. The internal teeth 22 extend 360° in a circular-arc shape with the central axis O as the center (refer to FIG. 4 as well). The internal teeth 22 are provided on the outer side in the radial direction of the external teeth 21.

The fixed member 25 is supported on the front side of the main plate 20. The fixed member 25 is formed in a cylindrical shape extending with the central axis O as the center. The fixed member 25 surrounds the rotary shaft 8. A flange portion 26 protruding outward in the radial direction is provided at an end portion on the front side of the fixed member 25. In the initial state, the flange portion 26 partially overlaps the tip portion 12 of each of the plurality of front decorative bodies 4 when viewed from the front (refer to FIGS. 1 and 2). Specifically, the flange portion 26 is located on the front side of the tip portion 12 of each of the plurality of front decorative bodies 4. In this way, for example, in a case where an impact is applied to the timepiece 1, the displacement of the tip portions 12 and the like of the plurality of front decorative bodies 4 to the front side is suppressed, and thus deflection of the front decorative bodies 4 is suppressed.

The rotating plate 30 is disposed on the front side of the main plate 20 and on the rear side of the flange portion 26 of the fixed member 25. The rotating plate 30 is formed in a circular shape centered on the central axis O when viewed from the front. A through-hole 31 into which an end portion on the rear side of the fixed member 25 is slippably inserted is formed at the center of the rotating plate 30.

Figure 6:
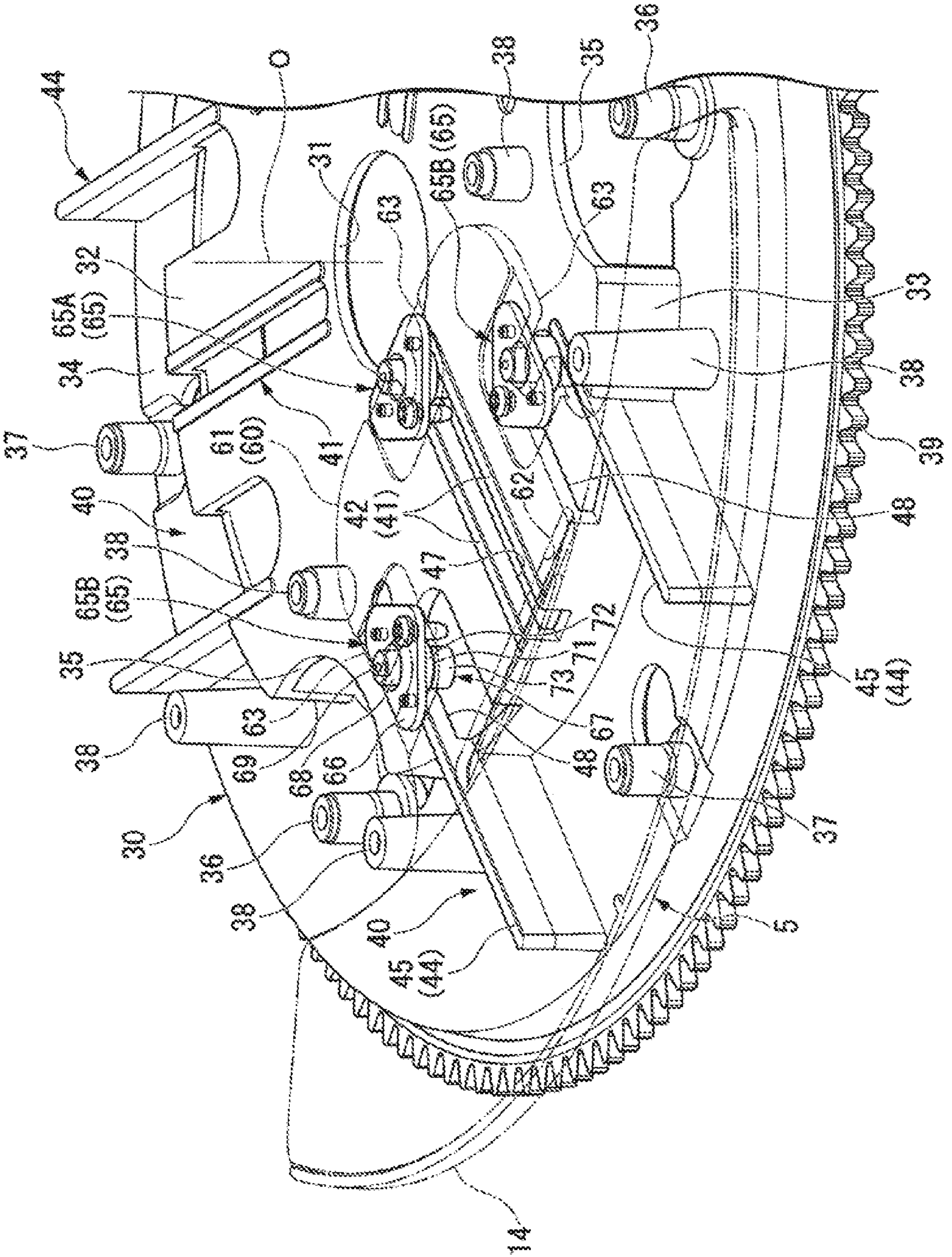
FIG. 6 is a perspective view showing a part of the timepiece of the embodiment.

FIG. 6 is a perspective view showing a part of the timepiece of the embodiment. In FIG. 6, the protrusion portion 14 of the rear decorative body 5 and an arm main body 61 are shown by imaginary lines.

As shown in FIG. 6, the rotating plate 30 is provided with an inner peripheral portion 32 extending from an inner peripheral end portion of the through-hole 31 to the outside in the radial direction, a stepped portion 33 extending from an outer peripheral end portion of the inner peripheral portion 32 to the rear side, and an outer peripheral portion 34 extending from an end portion on the rear side of the stepped portion 33 to the outside in the radial direction. The stepped portion 33 is located on the outer side in the radial direction of the external teeth 21 provided on the main plate 20 (refer to FIG. 5). Window portions 35 which are equal in number to the first gears 51 and into each of which the first gear 51 (refer to FIG. 3) is inserted are formed in the stepped portion 33. Teeth 39 are formed on the outer peripheral surface of the outer peripheral portion 34. The teeth 39 are located on the inner side in the radial direction of the internal teeth 22 provided on the main plate 20 (refer to FIG. 5). The teeth 39 mesh with a gear (not shown) and are connected to an output shaft of the motor described above.

The outer peripheral portion 34 is provided with a plurality of first shaft portions 36 each supporting the first gear 51, and a plurality of second shaft portions 37 each supporting the second gear 52. The plurality of first shaft portions 36 are provided in the same number as the plurality of first gears 51. The plurality of second shaft portions 37 are provided in the same number as the plurality of second gears 52. Each of the first shaft portions 36 and the second shaft portions 37 protrudes to the front side. Each of the plurality of first shaft portions 36 is provided at a position overlapping the window portion 35 formed in the stepped portion 33 in the circumferential direction. The plurality of first shaft portions 36 are provided on the same circumference centered on the central axis O. The plurality of second shaft portions 37 are provided on the same circumference centered on the central axis O on the outer side in the radial direction of the plurality of first shaft portions 36. The first shaft portions 36 and the second shaft portions 37 are alternately provided at equal angular intervals around the central axis O. That is, the angular interval between the first shaft portion 36 and the second shaft portion 37 adjacent to each other is 60°.

A plurality of bosses 38 to which the decorative plate 3 is connected are provided on the front surface side of the rotating plate 30. The boss 38 protrudes from the rotating plate 30 to the front side. The plurality of bosses 38 are provided around each first shaft portion 36. In this embodiment, three bosses 38 are provided around each first shaft portion 36. The plurality of bosses 38 are provided at positions overlapping the front decorative body 4 when viewed from the front. As the plurality of bosses 38, two bosses 38 are provided at the outer peripheral portion 34 around each first shaft portion 36, and one boss 38 is provided at the inner peripheral portion around each first shaft portion 36.

A plurality of guide portions 40 each guiding the movement of the rear decorative body 5 are provided on the front surface side of the rotating plate 30. The plurality of guide portions 40 are provided in the same number as the plurality of rear decorative bodies 5. One guide portion 40 is provided in the same area as each of the plurality of second shaft portions 37 in the circumferential direction. Here, in each guide portion 40, a direction in which an imaginary line segment connecting the central axis O and the center of the second shaft portion 37 when viewed from the front extends is defined as a first direction, and a direction orthogonal to the first direction when viewed from the front is defined as a second direction. The first direction is one direction of the directions extending radially with the central axis O as the center when viewed from the rotating plate 30. Further, the imaginary line segment connecting the central axis O and the center of the second shaft portion 37 when viewed from the front is referred to as a center line of the guide portion 40. The guide portion 40 can come into contact with the rear decorative body 5 in the second direction and restricts the movement of the rear decorative body 5 in the second direction. The guide portion 40 is provided with an inner guide portion 41 on the inner side in the radial direction and an outer guide portion 44 on the outer side in the radial direction.

The inner guide portion 41 is provided at the inner peripheral portion 32 of the rotating plate 30. The inner guide portion 41 is provided with a pair of inner rails 42. The pair of inner rails 42 is disposed symmetrically with the center line of the guide portion 40 interposed therebetween. The pair of inner rails 42 protrudes to the front side and extends parallel to the center line of the guide portion 40. The end portions on the front side of the pair of inner rails 42 are formed to be flat along a vertical plane to the central axis O. A through-hole 47 extending along the pair of inner rails 42 is formed between the pair of inner rails 42. The through-hole 47 receives a rear pin 67 (described later) of the rear decorative body 5.

The outer guide portion 44 is provided over the outer peripheral portion 34 from the inner peripheral portion 32 of the rotating plate 30. The outer guide portion 44 is provided with a pair of outer rails 45. The pair of outer rails 45 is disposed symmetrically with the center line of the guide portion 40 interposed therebetween. The pair of outer rails 45 is disposed at positions farther from the center line of the guide portion 40 in the second direction than in the pair of inner rails 42. The pair of outer rails 45 protrudes to the front side and extends parallel to the center line of the guide portion 40. The end portions on the front side of the pair of outer rails 45 are formed to be flat along the same plane as the end portions on the front side of the pair of inner rails 42. A through-hole 48 is formed on the center line side of the guide portion 40 in each of the pair of outer rails 45. The through-hole 48 is provided in the inner peripheral portion 32 of the rotating plate 30. The through-hole 48 receives the rear pin 67 of the rear decorative body 5.

As shown in FIGS. 3 and 5, each of the plurality of first gears 51 is rotatably supported on each of the first shaft portions 36. Each of the plurality of first gears 51 passes through the window portion 35 of the rotating plate 30 and meshes with the external teeth 21 of the main plate 20 on the rear side of the rotating plate 30. In this way, the rotating plate 30 rotates relative to the main plate 20, whereby the plurality of first gears 51 rotate while revolving around the central axis O in synchronization with the rotation of the rotating plate 30. A shaft extending from the rear surface of the front decorative body 4 is fixed to each of the plurality of first gears 51.

Each of the plurality of second gears 52 is rotatably supported on each of the second shaft portions 37. Each of the plurality of second gears 52 is disposed between the pair of outer rails 45 of the guide portion 40. The plurality of second gears 52 mesh with the internal teeth 22 of the main plate 20. In this way, the rotating plate 30 rotates relative to the main plate 20, whereby the plurality of second gears 52 rotate while revolving around the central axis O in synchronization with the rotation of the rotating plate 30. Each of the plurality of second gears 52 is provided with a guide pin 53 protruding to the front side at a position eccentric with respect to the center of rotation of the second gear 52. In the initial state, the guide pin 53 is located on the center line of the guide portion 40 when viewed from the front. That is, the guide pin 53 is located closest to the central axis O in the initial state.

The plurality of rear decorative bodies 5 are disposed one by one in the respective areas where the plurality of guide portions 40 are provided, in the circumferential direction. Each of the plurality of rear decorative bodies 5 is linked with the second gear 52 and provided so as to be parallel-movable with respect to the rotating plate 30 along the first direction in the guide portion 40. The rear decorative body 5 is further provided with an arm portion 60 in addition to the protrusion portion 14 described above. The arm portion 60 extends from the center of the inner peripheral edge 14*b* of the protrusion portion 14 to the inner side in the radial direction. The arm portion 60 is provided with a plurality of rear pins 67 protruding to the rear side and a plurality of front pins 68 protruding to the front side (refer to FIG. 6). In this embodiment, the arm portion 60 is provided with the arm main body 61 formed integrally with the protrusion portion 14, and a plurality of pin members 65 provided separately from the arm main body 61 and each integrally having the rear pin 67 and the front pin 68.

The arm main body 61 is disposed so as to overlap the center line of the guide portion 40 when viewed from the front. The arm main body 61 is formed in a plate shape extending in the first direction with a substantially constant width when viewed from the front. A guide groove 62, into which the guide pin 53 of the second gear 52 is inserted, and a plurality of mounting portions 63, to each of which the pin member 65 is mounted, are formed in the arm main body 61. The guide groove 62 is open on the rear surface of the arm main body 61 In this embodiment, the guide groove 62 penetrates the arm main body 61. The guide groove 62 extends across the center line of the guide portion 40. Specifically, the guide groove 62 extends in the second direction. The dimension of the guide groove 62 in the second direction is set to be equal to or more than the movement range of the guide pin 53 in the second direction according to the rotation of the second gear 52. The width of the guide groove 62 in the first direction is set to be larger than the outer diameter of the guide pin 53. In the initial state, the guide pin 53 is inserted into the center of the guide groove 62.

As shown in FIG. 6, the plurality of mounting portions 63 are provided in the same number as the plurality of pin members 65. The plurality of mounting portions 63 are provided at an end portion on the central axis O side of the arm main body 61 and end portions on both sides of the arm main body 61 in the second direction. Cutouts into each of which the rear pin 67 is inserted are formed in the plurality of mounting portions 63.

Each of the plurality of pin members 65 is mounted to the mounting portion 63. That is, each of the plurality of pin members 65 is provided with a first pin member 65A provided at the end portion on the central axis O side of the arm portion 60, and a pair of second pin members 65B provided at the end portions on both sides of the arm portion 60 in the second direction. The pair of second pin members 65B is provided symmetrically with the center line of the guide portion 40 interposed therebetween when viewed from the front. The pair of second pin members 65B is disposed on the outer side in the radial direction of the first pin member 65A.

Figure 7:
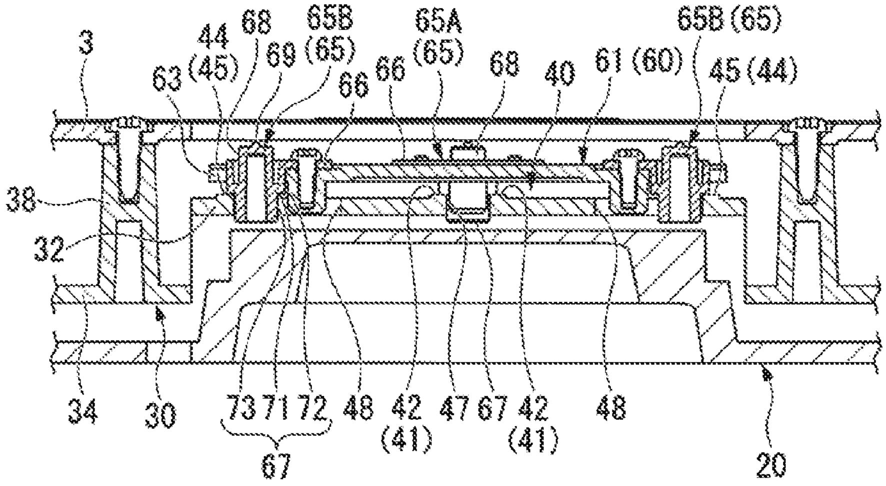
FIG. 7 is a cross-sectional view taken along line VII-VII of FIG. 3.

FIG. 7 is a cross-sectional view taken along line VII-VII of FIG. 3.

As shown in FIGS. 6 and 7, each of the plurality of pin members 65 is provided with a collar portion 66 overlapping the front surface of the arm main body 61, the rear pin 67 protruding toward the rear side from the collar portion 66, and the front pin 68 protruding toward the front side from the collar portion 66. The collar portion 66 is formed in a plate shaped. The collar portion 66 is disposed at a position overlapping the mounting portion 63 when viewed from the front, and is fixedly mounted to the arm main body 61 by fastening or the like. The rear pin 67 is formed in a columnar shape. The rear pin 67 passes through the inside of the cutout of the mounting portion 63 from the collar portion 66 and protrudes toward the rear side of the arm main body 61. A stepped surface 71 facing the rear side, a large diameter portion 72 extending from the stepped surface 71 to the front side, and a small diameter portion 73 extending from the stepped surface 71 to the rear side are formed on the outer peripheral surface of the rear pin 67. The front pin 68 is formed in a columnar shape coaxial with the rear pin 67. A hemispherical projection portion 69 protruding toward the front side is provided at an end portion on the front side of the front pin 68.

As shown in FIG. 6, the rear decorative body 5 is in contact with the guide portion 40 in the axial direction at two points different in position from each other in the first direction. Specifically, the stepped surface 71 of the first pin member 65A is in sliding contact with the end portions on the front side of the pair of inner rails 42 of the guide portion 40. Further, the stepped surfaces 71 of the pair of second pin members 65B are in sliding contact with the end portions on the front side of the pair of outer rails 45 of the guide portion 40 at positions different from the first pin member 65A in the first direction. In this way, the movement of the arm portion 60 to the rear side is restricted. Further, the rear decorative body 5 is in contact with the guide portion 40 in the axial direction at plural points different in position from each other in the second direction. Specifically, the stepped surface 71 of the first pin member 65A is in sliding contact with the end portions on the front side of the pair of inner rails 42 of the guide portion 40. Further, the stepped surface 71 of each of the pair of second pin members 65B is in sliding contact with the end portions on the front side of the pair of outer rails 45 of the guide portion 40 at positions different from the first pin member 65A in the second direction.

The rear decorative body 5 is capable of coming into contact with the guide portion 40 in the second direction at two points different in position from each other in the first direction. Specifically, the small diameter portion 73 of the first pin member 65A is disposed between the pair of inner rails 42 of the guide portion 40 and can come into contact with the inner rails 42 in the second direction. Further, the small diameter portions 73 of the pair of second pin members 65B are disposed between the pair of outer rails 45 of the guide portion 40 at positions different from the first pin member 65A in the first direction and can come into contact with the outer rails 45 in the second direction. In this way, the movement of the rear decorative body 5 in the second direction with respect to the rotating plate 30 is restricted at two points different in position from each other in the first direction, and therefore, the rear decorative body 5 is parallel-movable with respect to the rotating plate 30 in the first direction.

As shown in FIG. 7, the decorative plate 3 is disposed on the side opposite to the rotating plate 30 with the rear decorative body 5 interposed therebetween. The decorative plate 3 is fixedly mounted to the rotating plate 30. Specifically, the decorative plate 3 is fastened to the plurality of bosses 38 of the rotating plate 30. The decorative plate 3 holds the arm portion 60 of the rear decorative body 5 between the inner rail 42 and the outer rail 45 of the rotating plate 30. Specifically, the projection portions 69 of the respective pin members 65 of the rear decorative body 5 are in slidable point-contact with the rear surface of the decorative plate 3. That is, the rear decorative body 5 is in contact with the decorative plate 3 in the axial direction at two points different in position from each other in the first direction. In this way, the decorative plate 3 holds the arm portion 60 together with the rotating plate 30 at two points different in position from each other in the first direction to suppress the deflection of the rear decorative body 5. Further, the rear decorative body 5 is in contact with the decorative plate 3 in the axial direction at plural points different in position from each other in the second direction. In this way, the decorative plate 3 holds the arm portion 60 together with the rotating plate 30 at plural points different in position from each other in the second direction to suppress twist of the rear decorative body 5. The place with which the projection portion 69 of each pin member 65 comes into contact, on the rear surface of the decorative plate 3, is formed so as to protrude by one step toward the projection portion 69 side.

As shown in FIG. 6, in a case where the arm portion 60 is in the initial state, the arm portion 60 is located within a rectangular area surrounded by the four bosses 38. The decorative plate 3 in this embodiment is made of, for example, a polyacetal resin (POM) material, and since such a member is relatively soft and the decorative plate 3 itself is large in terms of an area, there is a case where the decorative plate 3 itself is warped, so that it becomes difficult to maintain the surface on the rear side of the decorative plate 3 flat. By fastening the decorative plate 3 to the bosses 38 and correcting the shape of the decorative plate 3, it becomes possible to maintain particularly the area surrounded by the bosses 38 relatively flat. With the configuration in which such a flat area is formed, the holding of the arm portion 60 is stabilized and it is possible to even further suppress the deflection of the rear decorative body 5. Further, the parallel movement of the rear decorative body 5 can be performed more smoothly.

A through-hole 3*a* into which the shaft portion extending from the rear surface of the front decorative body 4 is inserted is formed in the decorative plate 3, whereby the first gear 51 and the front decorative body 4 which are provided on the opposite sides to each other with the decorative plate 3 interposed therebetween are connected to each other (refer to FIG. 5). The plurality of front decorative bodies 4 are fixedly mounted to the first gear 51 and rotate around an axis provided fixedly with respect to the rotating plate 30 and the decorative plate 3.

Next, the operation of the timepiece 1 will be described in detail.

As described above, in the initial state of the timepiece 1, the decorative plate 3 and the plurality of front decorative bodies 4 are maintained in a circular state as a whole when viewed from the front. Further, the entirety of the plurality of rear decorative bodies 5 is covered with the decorative plate 3 when viewed from the front.

Here, if the motor connected to the teeth 39 of the rotating plate 30 is driven, the rotating plate 30 rotates relative to the main plate 20 and the plurality of first gears 51 and the plurality of second gears 52 revolve. Since the first gear 51 meshes with the external teeth 21 of the main plate 20, the first gear 51 rotates in synchronization with the revolution. In this way, the front decorative body 4 fixedly mounted to the first gear 51 also rotates with respect to the decorative plate 3.

The second gear 52 meshes with the internal teeth 22 of the main plate 20, and therefore, the second gear 52 rotates in synchronization with the revolution. In this way, the guide pin 53 provided at the second gear 52 is displaced in a direction away from the central axis O in the first direction while being displaced in the second direction from a position closest to the central axis O in the initial state. At this time, the rear decorative body 5 is provided so as to be parallel-movable with respect to the rotating plate 30 in the first direction, and therefore, the guide pin 53 moves in the second direction in the guide groove 62 while pushing the rear decorative body 5 in a direction away from the central axis O in the first direction. If the guide pin 53 reaches a position farthest from the central axis O, a state where the rear decorative body 5 most protrudes from the decorative plate 3 when viewed from the front is created. Further, if the second gear 52 continues to rotate, the guide pin 53 is displaced in a direction approaching the central axis O in the first direction while being displaced in the second direction, and the rear decorative body 5 moves in the direction approaching the central axis O in the first direction.

As described above, the timepiece 1 of this embodiment includes the rotating plate 30 rotatable relative to the main plate 20 around the central axis O, the second gear 52 rotatably supported on the rotating plate 30 and rotating in synchronization with the rotation of the rotating plate 30 with respect to the main plate 20, and the rear decorative body 5 that is linked with the second gear 52 and displaced along the first direction.

According to this configuration, it is possible to move the rear decorative body 5 in a direction approaching and away from the central axis O while making the rear decorative body 5 revolve around the central axis O in synchronization with the rotation of the rotating plate 30. Accordingly, the timepiece 1 provided with the rear decorative body 5 performing a complicated operation which is not performed in the timepiece of the related art can be provided.

Further, the rear decorative body 5 is disposed on the rear side of the decorative plate 3 forming a dial and configured to protrude from the decorative plate 3 when viewed from the front.

According to this configuration, it is possible to express an operation in which the rear decorative body 5 protrudes from the rear side of the decorative plate 3 or returns to the rear side of the decorative plate 3. Accordingly, it is possible to make the timepiece more interesting as compared with the timepiece of the related art.

Further, the main plate 20 is provided with the internal teeth 22 extending in a circular-arc shape with the central axis O as the center. The second gear 52 meshes with the internal teeth 22.

According to this configuration, if the rotating plate 30 is rotated relative to the main plate 20, the second gear 52 meshing with the internal teeth 22 of the main plate 20 rotates while revolving around the central axis O. Accordingly, it is possible to form the second gear 52 rotating in synchronization with the rotation of the rotating plate 30.

Further, the rotating plate 30 is provided with the guide portion 40 capable of coming into contact with the rear decorative body 5 in the second direction.

According to this configuration, the displacement of the rear decorative body 5 in the second direction can be restricted by the guide portion 40. Accordingly, it is possible to make the rear decorative body 5 revolve around the central axis O in synchronization with the rotation of the rotating plate 30.

Further, the rear decorative body 5 is configured to come into contact with the guide portion 40 at two points different in position from each other in the first direction.

Here, in a case where the guide portion comes into contact with the rear decorative body 5 at one point, there is a possibility that the rear decorative body 5 may be displaced so as to rotate on the rotating plate 30 with the contact portion as a fulcrum. According to the above configuration, it is possible to suppress the rear decorative body 5 being displaced so as to rotate on the rotating plate 30. Therefore, it is possible to make the rear decorative body 5 be displaced along the first direction extending radially when viewed from the rotating plate 30.

Further, the second gear 52 is provided with the guide pin 53 protruding toward the rear decorative body 5 side at a position eccentric with respect to the center of rotation of the second gear 52. The rear decorative body 5 has the guide groove 62 extending in a direction intersecting the first direction and the guide pin 53 is inserted into the guide groove 62.

According to this configuration, it is possible to make the rear decorative body 5 be displaced in the first direction in conjunction with the displacement of the guide pin 53 in the first direction while allowing the displacement of the guide pin 53 relative to the rear decorative body 5 in the direction intersecting the first direction by making the guide pin 53 be displaced in the guide groove 62. Therefore, it is possible to convert the rotary motion of the second gear 52 into the linear motion of the rear decorative body 5.

Further, the timepiece 1 includes the decorative plate 3 coming into contact with the rear decorative body 5 on an opposite side of the rear decorative body 5 from the rotating plate 30.

According to this configuration, the displacement of the rear decorative body 5 in the direction away from the rotating plate 30 can be restricted by the decorative plate 3. Therefore, it is possible to stabilize the rear decorative body 5.

Further, the rear decorative body 5 is in contact with the decorative plate 3 at two points different in position from each other in the first direction.

Here, in a case where the decorative plate comes into contact with the rear decorative body 5 at one point, there is a possibility that the rear decorative body 5 may be displaced so as to be deflected with the contact portion as a fulcrum. According to the above configuration, it is possible to suppress the deflection of the rear decorative body 5. Therefore, it is possible to more stabilize the rear decorative body 5.

Further, the timepiece 1 includes the first gear 51 rotatably supported on the rotating plate 30 and rotating in synchronization with the rotation of the rotating plate 30 with respect to the main plate 20, and the front decorative body 4 fixedly mounted to the first gear 51.

According to this configuration, it is possible to rotate the front decorative body 4 with respect to the rotating plate 30 while making the front decorative body 4 revolve around the central axis O in synchronization with the rotation of the rotating plate 30. Accordingly, it is possible to provide the timepiece 1 provided with the front decorative body 4 performing a complicated operation.

The present invention is not limited to the embodiment described above with reference to the drawings, and various modification examples can be considered within the technical scope of the present invention.

For example, in the embodiment described above, the three rear decorative bodies 5 are provided. However, there is no limitation thereto, and the number of rear decorative bodies can be set randomly. The same applies to the front decorative body. Further, the present invention may also be applied to a timepiece that does not have a front decorative body.

Further, in the embodiment described above, in the initial state, the rear decorative body 5 is covered with the decorative plate 3 when viewed from the front. However, there is no limitation thereto. In the initial state, a part of the rear decorative body may protrude from the decorative plate 3 when viewed from the front. Further, the shape of the protrusion portion 14 of the rear decorative body 5 is not limited to that in the above embodiment and can be randomly designed.

Further, in the embodiment described above, the guide pin 53 of the second gear 52 is inserted into the guide groove 62 formed in the rear decorative body 5, whereby the rear decorative body 5 and the second gear 52 are linked with each other. However, the linkage configuration of the rear decorative body 5 and the second gear 52 is not limited thereto. For example, a guide pin of the rear decorative body may be inserted into a guide groove formed in the second gear. Further, the rear decorative body and the second gear may be linked with each other by a rack-and-pinion mechanism. Specifically, a configuration may be made in which a rack meshing with the second gear is provided on the rear decorative body and the rear decorative body is capable of parallel-moving with respect to the rotating plate 30.

Further, in the embodiment described above, the guide groove 62 extends in the second direction. However, there is no limitation thereto.

Further, in the embodiment described above, the second gear 52 meshes with the internal teeth 22 of the main plate 20, whereby the second gear 52 is made rotatable in synchronization with the rotation of the rotating plate 30 with respect to the main plate 20. However, there is no limitation thereto. For example, the second gear may mesh with the external teeth 21 of the main plate 20. Further, for example, the second gear may be made rotatable in synchronization with the rotation of the rotating plate 30 with respect to the main plate 20 by making the second gear mesh with the first gear 51 through another gear.

In addition, it is possible to appropriately replace the constituent elements in the above-described embodiment with well-known constituent elements within a scope which does not depart from the gist of the present invention.

What is claimed is:

1. A timepiece comprising:
- a main plate;
- a rotating plate rotatable relative to the main plate around a predetermined central axis of rotation;
- a gear rotatably supported on the rotating plate and rotatable in synchronization with rotation of the rotating plate with respect to the main plate; and

- a decorative body linked with the gear and movable along a first direction while revolving around the predetermined central axis of rotation, the first direction extending radially from the predetermined central axis of rotation when viewed from the rotating plate,
- wherein the rotating plate is provided with pin members for revolution with the rotating plate around the predetermined central axis of rotation, the pin members being configured to come into contact with the decorative body to restrict the decorative body from moving in a second direction relative to the rotating plate and guide the decorative body to move in the first direction relative to the rotating plate while revolving around the predetermined central axis of rotation, wherein the second direction extends orthogonally to the first direction when viewed in an axial direction of the predetermined central axis of rotation, and
- wherein the rotating plate is provided with a pair of rails arranged to guide the decorative body to move in the first direction.

2. The timepiece according to claim 1, wherein the decorative body is disposed on a rear side of a dial and movable to protrude radially outside from the dial when viewed from the front.

3. The timepiece according to claim 1, wherein the main plate is provided with a tooth part arranged in an arcuate manner around the predetermined central axis of rotation, and the gear is configured to mesh with the tooth part.

4. The timepiece according to claim 1, wherein the decorative body is configured to come into contact with the pin members at at least two points away from each other in the first direction.

5. The timepiece according to claim 4, wherein the pin members come into contact with the decorative body on an opposite side of the decorative body from the rotating plate.

6. The timepiece according to claim 5, wherein the decorative body is in contact with the pin members at at least two points away from each other in the first direction.

7. The timepiece according to claim 1, wherein the gear is provided with a guide pin protruding toward the decorative body at a position eccentric with respect to a center of rotation of the gear, and the decorative body has a guide groove extending in a direction intersecting the first direction, the guide pin being inserted into the guide groove.

* * * * *